(12) United States Patent
Tolbert, Jr.

(10) Patent No.: US 8,650,894 B2
(45) Date of Patent: Feb. 18, 2014

(54) SYSTEM AND METHOD FOR COMPRESSOR CAPACITY MODULATION IN A HEAT PUMP

(75) Inventor: John Willard Tolbert, Jr., Bristol, TN (US)

(73) Assignee: Bristol Compressors International, Inc., Bristol, VA (US)

( * ) Notice: Subject to any disclaimer, the term of this patent is extended or adjusted under 35 U.S.C. 154(b) by 1002 days.

(21) Appl. No.: 12/498,259

(22) Filed: Jul. 6, 2009

(65) Prior Publication Data

US 2009/0266091 A1 Oct. 29, 2009

Related U.S. Application Data

(63) Continuation of application No. 11/464,586, filed on Aug. 15, 2006, now abandoned, and a continuation-in-part of application No. 11/196,182, filed on Aug. 3, 2005, now Pat. No. 7,628,028.

(51) Int. Cl.
 *F25B 1/00* (2006.01)
 *F25B 49/00* (2006.01)
 *F25B 13/00* (2006.01)

(52) U.S. Cl.
 USPC ............ 62/229; 62/228.1; 62/228.5; 62/324.1

(58) Field of Classification Search
 USPC ........ 62/160, 228.1, 228.4, 228.5, 229, 324.1
 See application file for complete search history.

(56) References Cited

U.S. PATENT DOCUMENTS

| | | | |
|---|---|---|---|
| 2,219,199 A | 10/1940 | Renner | |
| 2,390,650 A | 12/1945 | Hollatz et al. | |
| 3,261,172 A | 7/1966 | Grant | |
| 3,388,559 A | 6/1968 | Johnson | |
| 3,411,313 A | 11/1968 | Brown et al. | |
| 3,874,187 A | 4/1975 | Anderson | |
| 3,903,710 A | 9/1975 | Quatman | |
| 4,045,973 A | 9/1977 | Anderson et al. | |
| 4,047,242 A | 9/1977 | Jakob et al. | |
| 4,475,358 A | 10/1984 | Seifert et al. | |
| 4,487,028 A | 12/1984 | Foye | |
| 4,514,989 A | 5/1985 | Mount | |
| 4,577,471 A | 3/1986 | Meckler | |
| 4,616,693 A | 10/1986 | Dietzsch et al. | |
| 4,709,560 A | 12/1987 | Voorhis et al. | |
| 4,720,981 A | 1/1988 | Helt et al. | |
| 4,891,953 A * | 1/1990 | Isono | 62/209 |

(Continued)

FOREIGN PATENT DOCUMENTS

| | | |
|---|---|---|
| CN | 2401835 U | 10/2000 |
| DE | 4338939 C1 | 2/1995 |

(Continued)

*Primary Examiner* — Mohammad M Ali
*Assistant Examiner* — Daniel C Comings
(74) *Attorney, Agent, or Firm* — McNees Wallace & Nurick LLC

(57) ABSTRACT

A system and method is provided to control and operate a compressor to have two or more discrete output capacities in response to an outdoor temperature measurement. During operation of the compressor in an air conditioning or cooling mode, the compressor has a first output capacity in response to the outdoor temperature being greater than a first temperature setpoint and the compressor has a second output capacity in response to the outdoor temperature being less than a second temperature setpoint. During operation of the compressor in a heating mode, the compressor has different output capacities based on the outdoor ambient temperature.

28 Claims, 8 Drawing Sheets

(56) References Cited

U.S. PATENT DOCUMENTS

| | | |
|---|---|---|
| 4,895,005 A | 1/1990 | Norbeck et al. |
| 4,951,475 A | 8/1990 | Alsenz |
| 4,965,658 A | 10/1990 | Norbeck et al. |
| 5,012,656 A | 5/1991 | Tamura |
| 5,025,638 A | 6/1991 | Yamagishi et al. |
| 5,044,167 A | 9/1991 | Champagne |
| 5,052,186 A | 10/1991 | Dudley et al. |
| 5,062,276 A | 11/1991 | Dudley |
| 5,062,277 A | 11/1991 | Heitmann et al. |
| 5,066,197 A | 11/1991 | Champagne |
| 5,081,846 A | 1/1992 | Dudley et al. |
| 5,088,297 A | 2/1992 | Maruyama et al. |
| 5,107,685 A | 4/1992 | Kobayashi |
| 5,144,812 A | 9/1992 | Mills, Jr. et al. |
| 5,177,972 A | 1/1993 | Sillato et al. |
| 5,182,915 A | 2/1993 | Iidea et al. |
| 5,220,809 A | 6/1993 | Voss |
| 5,263,335 A | 11/1993 | Isono et al. |
| 5,285,646 A | 2/1994 | TaeDuk |
| 5,303,561 A | 4/1994 | Bahel et al. |
| 5,315,376 A | 5/1994 | Wada et al. |
| 5,323,619 A * | 6/1994 | Kim .................. 62/160 |
| 5,350,039 A | 9/1994 | Voss et al. |
| 5,475,985 A | 12/1995 | Heinrichs et al. |
| 5,533,352 A | 7/1996 | Bahel et al. |
| 5,546,073 A | 8/1996 | Duff et al. |
| 5,553,997 A | 9/1996 | Goshaw et al. |
| 5,568,732 A | 10/1996 | Isshiki et al. |
| 5,651,260 A | 7/1997 | Goto et al. |
| 5,671,607 A | 9/1997 | Clemens et al. |
| 5,729,995 A | 3/1998 | Tajima |
| 5,752,385 A | 5/1998 | Nelson |
| 5,764,011 A | 6/1998 | Nakae et al. |
| 5,765,994 A | 6/1998 | Barbier |
| 5,826,643 A | 10/1998 | Galyon et al. |
| 6,034,872 A | 3/2000 | Chrysler et al. |
| 6,041,609 A | 3/2000 | Homsleth et al. |
| 6,070,110 A | 5/2000 | Shah et al. |
| 6,116,040 A | 9/2000 | Stark |
| 6,172,476 B1 | 1/2001 | Tolbert, Jr. et al. |
| 6,237,420 B1 | 5/2001 | Rowlette et al. |
| 6,330,153 B1 | 12/2001 | Ketonen et al. |
| 6,353,303 B1 | 3/2002 | Ramachandran et al. |
| 6,363,732 B1 | 4/2002 | Bluhm |
| 6,375,563 B1 | 4/2002 | Colter |
| 6,384,563 B1 | 5/2002 | Someya |
| 6,434,003 B1 | 8/2002 | Roy et al. |
| 6,434,960 B1 | 8/2002 | Rousseau |
| 6,511,295 B2 | 1/2003 | Suitou et al. |
| 6,523,361 B2 | 2/2003 | Higashiyama |
| 6,524,082 B2 | 2/2003 | Morita et al. |
| 6,560,980 B2 | 5/2003 | Gustafson et al. |
| 6,560,984 B2 | 5/2003 | Bellet |
| 6,604,372 B2 | 8/2003 | Baumert et al. |
| 6,639,798 B1 | 10/2003 | Jeter et al. |
| 6,663,358 B2 | 12/2003 | Loprete et al. |
| 6,675,590 B2 | 1/2004 | Aarestrup |
| 6,688,124 B1 | 2/2004 | Stark et al. |
| 6,704,202 B1 | 3/2004 | Hamaoka et al. |
| 6,808,372 B2 | 10/2004 | Makino et al. |
| 6,817,198 B2 | 11/2004 | Wilson et al. |
| 6,826,923 B2 | 12/2004 | Nakano et al. |
| 6,829,904 B2 | 12/2004 | Roh et al. |
| 6,874,329 B2 | 4/2005 | Stark et al. |
| 6,886,354 B2 | 5/2005 | Dudley |
| 7,164,242 B2 | 1/2007 | Federman et al. |
| 7,628,028 B2 | 12/2009 | Tolbert, Jr. et al. |
| 7,878,006 B2 | 2/2011 | Pham |
| 2001/0000880 A1 | 5/2001 | Chu et al. |
| 2001/0017039 A1 | 8/2001 | Weimer |
| 2002/0043074 A1 | 4/2002 | Ott et al. |
| 2002/0108384 A1 | 8/2002 | Higashiyama |
| 2003/0089121 A1 | 5/2003 | Wilson et al. |
| 2003/0205052 A1 * | 11/2003 | Kim et al. .................. 62/228.1 |
| 2004/0003610 A1 | 1/2004 | So et al. |
| 2004/0055322 A1 | 3/2004 | Monfarad |
| 2004/0065095 A1 | 4/2004 | Osborne et al. |
| 2004/0139112 A1 | 7/2004 | Wickham et al. |
| 2004/0163403 A1 | 8/2004 | Monfarad |
| 2004/0174650 A1 | 9/2004 | Wyatt et al. |
| 2004/0194485 A1 | 10/2004 | Dudley |
| 2004/0237551 A1 * | 12/2004 | Schwarz et al. .................. 62/229 |
| 2004/0237554 A1 | 12/2004 | Stark et al. |
| 2004/0261441 A1 | 12/2004 | Turner et al. |
| 2005/0076665 A1 | 4/2005 | Pruitt |
| 2005/0083630 A1 | 4/2005 | Jun et al. |
| 2005/0086959 A1 * | 4/2005 | Wilson et al. .................. 62/228.3 |
| 2005/0100449 A1 | 5/2005 | Hahn et al. |
| 2005/0247073 A1 | 11/2005 | Hikawa et al. |
| 2006/0010891 A1 * | 1/2006 | Rayburn .................. 62/176.6 |
| 2007/0022765 A1 | 2/2007 | Lifson et al. |
| 2007/0095081 A1 | 5/2007 | Ootori et al. |
| 2007/0256432 A1 | 11/2007 | Zugibe et al. |
| 2008/0041081 A1 | 2/2008 | Tolbert |
| 2009/0090118 A1 | 4/2009 | Pham et al. |
| 2009/0324426 A1 | 12/2009 | Moody et al. |
| 2009/0324427 A1 | 12/2009 | Tolbert, Jr. et al. |
| 2009/0324428 A1 | 12/2009 | Tolbert, Jr. et al. |

FOREIGN PATENT DOCUMENTS

| | | |
|---|---|---|
| EP | 0196863 A1 | 10/1986 |
| EP | 0376498 A1 | 7/1990 |
| EP | 0933603 A1 | 8/1999 |
| EP | 1260774 A2 | 11/2002 |
| EP | 1164035 B1 | 8/2004 |
| JP | 58127038 A | 7/1983 |
| JP | 62029853 A | 2/1987 |
| JP | 01296038 A | 11/1989 |
| JP | 4338670 A | 11/1992 |
| JP | 6213498 A | 8/1994 |
| JP | 814709 A | 1/1996 |
| JP | 8145405 A | 6/1996 |
| JP | 2000111216 A | 4/2000 |
| JP | 2001163038 A | 6/2001 |
| JP | 2003214659 A | 7/2003 |
| JP | 2004219031 A | 8/2004 |
| JP | 2004325023 A | 11/2004 |
| JP | 2006343095 A | 12/2006 |
| WO | 9411212 A1 | 5/1994 |
| WO | 9815790 A1 | 4/1998 |
| WO | 0022358 A1 | 4/2000 |
| WO | 0078111 A1 | 12/2000 |

\* cited by examiner

SYSTEM AND METHOD FOR COMPRESSOR CAPACITY MODULATION IN A HEAT PUMP

BACKGROUND OF THE INVENTION

The present invention relates generally to a control system for a compressor. More specifically, the present invention relates to a capacity modulation system for a compressor that can automatically adjust the capacity of the compressor in a heat pump during a heating operation.

Frequently, motors for driving compressors in heating, ventilation and air conditioning (HVAC) systems are designed to operate from standard line (main) voltages and frequencies (e.g., 230 V, 60 Hz) that are available at the location where the HVAC system is being operated. The use of line voltages and frequencies results in the motor being limited to one operating speed that is based on the input frequency to the motor. The operation of the motor at one speed, in turn, results in the compressor being limited to a single output capacity. Furthermore, motors that require their own controller or electronic drive, e.g., switched reluctance motors, cannot be used for these HVAC systems, as such motors cannot operate directly from standard (main) voltages and frequencies.

One problem with the compressor being limited to a single output capacity is that the compressor, especially a reciprocating compressor, has a limited heating capacity at reduced outdoor ambient temperatures. This limited heating capacity produced by the compressor adversely affects the EER (Energy Efficiency Rating) and HSPF (Heating Season Performance Factor) of any system incorporating the compressor during testing and in subsequent operation of the system. Furthermore, the limited heating capacity output of the compressor at reduced outdoor ambient temperatures requires additional (and more costly) heating techniques to be used to maintain a setpoint temperature in an enclosed space.

Therefore, what is needed is a cost-effective, efficient and easily implemented system to boost the heating capacity of a compressor at reduced outdoor ambient temperatures.

SUMMARY OF THE INVENTION

An embodiment of the present invention is directed to a method for modulating capacity in a compressor for a heat pump operating in a heating mode. The method includes providing a controller configured to provide a plurality of discrete output frequencies to a motor for the compressor of the heat pump, measuring an outdoor ambient temperature, selecting a discrete output frequency of the plurality of discrete output frequencies in response to the measured outdoor ambient temperature, operating the motor at the selected discrete output frequency and a corresponding voltage to produce a corresponding output capacity for the compressor. The selected discrete output frequency of the plurality of discrete output frequencies is inversely related to the measured outdoor ambient temperature.

Another embodiment of the present invention is directed to an HVAC&R system having a compressor, a condenser arrangement and an evaporator arrangement connected in a closed refrigerant loop. The HVAC&R system also has a motor connected to the compressor to power the compressor and a control system to power the motor. The motor is configured to operate at a plurality of output speeds to generate a plurality of output capacities from the compressor. The control system is configured to provide the motor with a plurality of discrete output frequencies to generate the plurality of output speeds in the motor. The HVAC&R system further includes a sensor arrangement to measure a parameter corresponding to an outdoor ambient temperature and to provide a signal to the control system with the measured parameter. Finally, in response to the HVAC&R system operating in a heating mode, the control system is configured to provide a discrete output frequency of the plurality of discrete output frequencies to the motor in response to the measured parameter and the provided discrete output frequency is increased in response to a decrease in the outdoor ambient temperature to generate an increase in the output capacity of the compressor.

Still another embodiment of the present invention is directed to a method for controlling capacity in a compressor of an HVAC&R system. The method includes providing a controller configured to provide a plurality of discrete output frequencies to a motor for the compressor, measuring an outdoor ambient temperature, and determining whether the HVAC&R system is operating in a heating mode or a cooling mode. In response to the HVAC&R system operating in a heating mode, executing a heating mode operation process that includes selecting a discrete heating mode output frequency of the plurality of discrete heating mode output frequencies in response to the measured outdoor ambient temperature, operating the motor at the selected discrete heating mode output frequency and a corresponding voltage to produce a corresponding output capacity for the compressor, and wherein the selected discrete heating mode output frequency of a plurality of discrete heating mode output frequencies progressively increases in response to the measured outdoor ambient temperature decreasing to provide an increase in the output capacity of the compressor. In response to the HVAC&R system operating in a cooling mode, executing a cooling mode operation process that includes comparing the measured outdoor ambient temperature to at least one predetermined temperature setpoint, selecting a discrete cooling mode output frequency of a plurality of discrete cooling mode output frequencies based on the comparison of the measured outdoor ambient temperature and the at least one predetermined temperature setpoint, operating the motor at the selected cooling mode discrete output frequency and a corresponding voltage to produce a corresponding output capacity for the compressor, and wherein the selected discrete cooling mode output frequency of the plurality of discrete cooling mode output frequencies progressively increases in response to the measured outdoor ambient temperature increasing to provide an increase in the output capacity of the compressor.

One advantage of the present invention is increased system performance, efficiency and capacity control at reduced outdoor ambient temperatures in both heating and cooling modes of operation.

A further advantage of the present invention is that the capacity modulation of the compressor is invisible when compared to a standard single stage compressor.

Another advantage of the present invention is that the motor drive can be used for different types of input power (i.e., multi-voltage and single phase or three phase) and with different types of compressors and motors.

An additional advantage of the present invention is that no additional starting components are needed, e.g., start capacitors and/or relays.

Another advantage of the present invention is that the compressor output can be tuned to a specific system incorporating the compressor.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
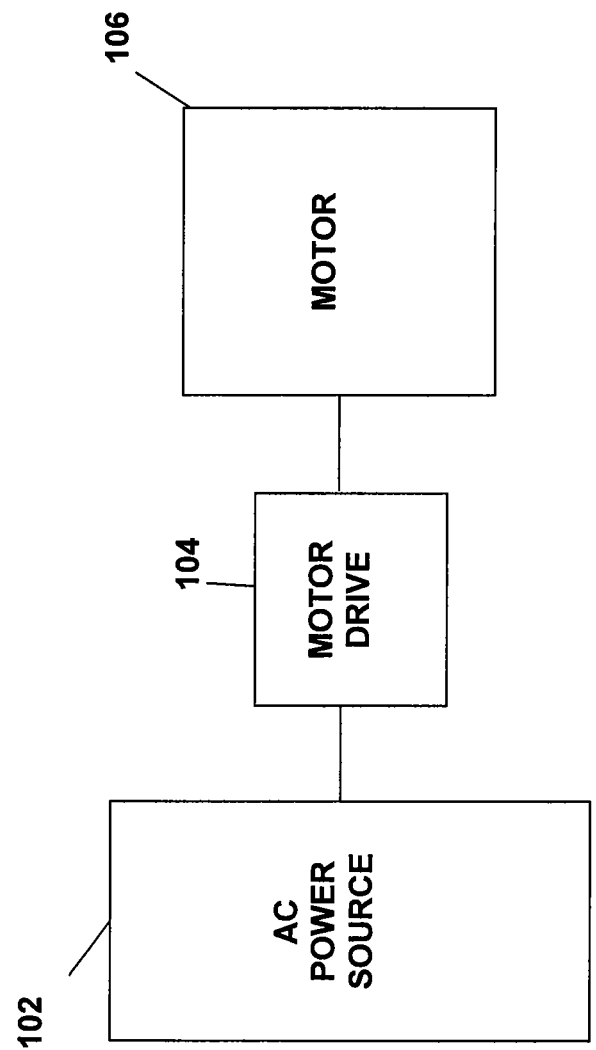
FIG. 1 illustrates schematically a general configuration of the present invention.

FIG. 1 illustrates generally a system configuration of the present invention. An AC power source 102 supplies electrical power to a motor drive 104, which powers a motor 106. The motor 106 is preferably used to drive a corresponding compressor of a HVAC&R system (see generally, FIGS. 3A and 3B). The AC power source 102 provides single phase or multi-phase (e.g., three phase), fixed voltage, and fixed frequency AC power to the motor drive 104. The motor drive 104 can accommodate virtually any AC power source 102, preferably an AC power source 102 that can supply an AC voltage or line voltage of 187 V, 208 V, 230 V, 380 V, 460 V, or 600 V, at a line frequency of 50 Hz or 60 Hz.

The motor drive 104 can be a variable speed drive (VSD) or variable frequency drive (VFD) that receives AC power having a particular fixed line voltage and fixed line frequency from the AC power source 102 and provides power to the motor 106 at a desired voltage and desired frequency (including providing a desired voltage greater than the fixed line voltage and/or providing a desired frequency greater than the fixed line frequency), both of which can be varied to satisfy particular requirements. Alternatively, the motor drive 104 can be a "stepped" frequency drive that can provide a predetermined number of discrete output frequencies and voltages, i.e., two or more, to the motor 106.

Figure 2:
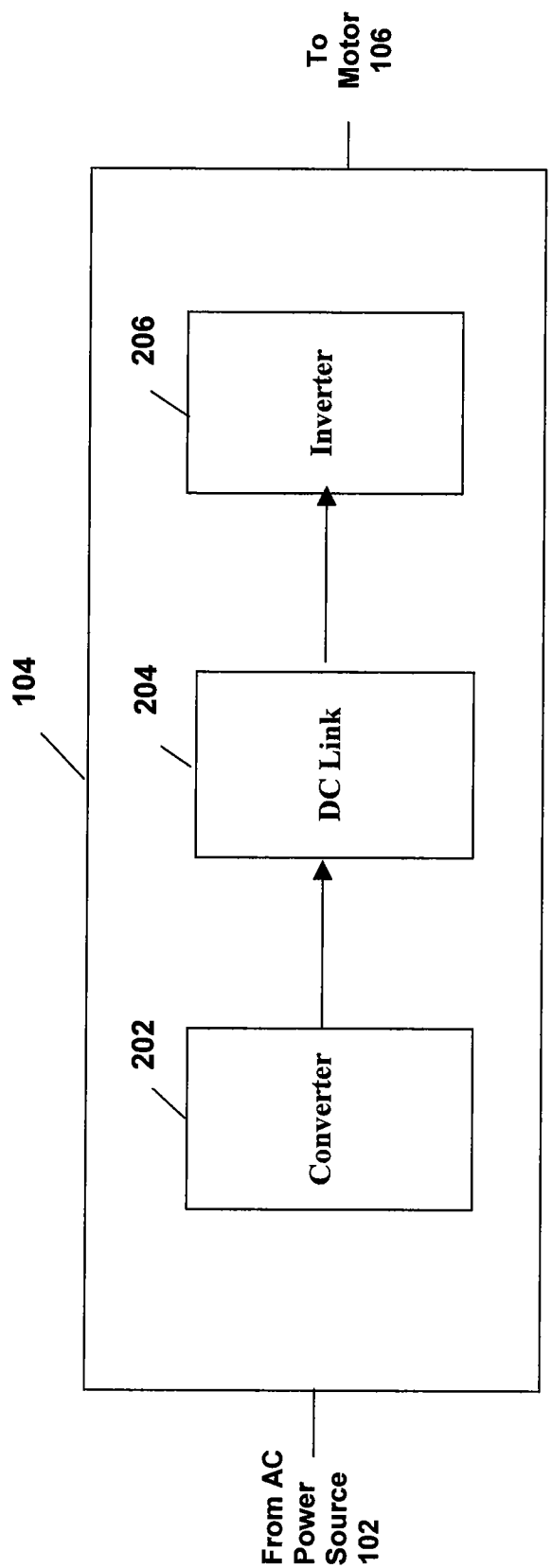
FIG. 2 illustrates schematically an embodiment of a variable speed drive of the present invention.

FIG. 2 illustrates one embodiment of the motor drive (VSD) 104 of the present invention. The VSD 104 can have three stages: a converter/rectifier stage 202, a DC link/regulator stage 204 and an output stage having an inverter 206. The converter 202 converts the fixed line frequency, fixed line voltage AC power from the AC power source 102 into DC power. The DC link 204 filters the DC power from the converter 202 and provides energy storage components. The DC link 204 can be composed of capacitors and inductors, which are passive devices that exhibit high reliability rates and very low failure rates. The inverter 206 converts the DC power from the DC link 204 into variable frequency, variable voltage power for the motor 106. Furthermore, it is to be understood that the converter 202, DC link 204 and inverter 206 of the VSD 104 can incorporate several different components and/or configurations so long as the converter 202, DC link 204 and inverter 206 of the VSD 104 can provide the motor 106 with appropriate output voltages and frequencies.

The motor drive (VSD) 104 can be used to slowly increase (ramp-up) the speed and/or torque of the motor 106 during a start-up of the motor 106. The ramping-up of the speed and/or torque during start-up can minimize hydraulic forces in the compressor, if liquid refrigerant is present in the oil sump, thereby eliminating the need to preheat oil in the compressor before start-up with a crankcase oil heater.

In addition, in one embodiment of the present invention, the motor 106 can operate from a nominal voltage that is less than the fixed voltage provided by the AC power source 102 and output by the motor drive 104. By operating at a voltage that is less than the fixed AC voltage, the motor 106 is able to continue operation during times when the fixed input voltage to the motor drive 104 fluctuates. For example, the motor can be nominally optimized for approximately 187 V (i.e., the lowest expected voltage for this type of equipment) so any low or high voltage excursions from the normal line voltages are absorbed by the drive and a constant voltage is applied to the motor. This "multivoltage input and output voltage regulator" feature permits one drive to operate on virtually any available AC power source. As is known, the nominal output voltage value of the drive is frequency and load dependent and can vary based on those needs.

Figure 3A:
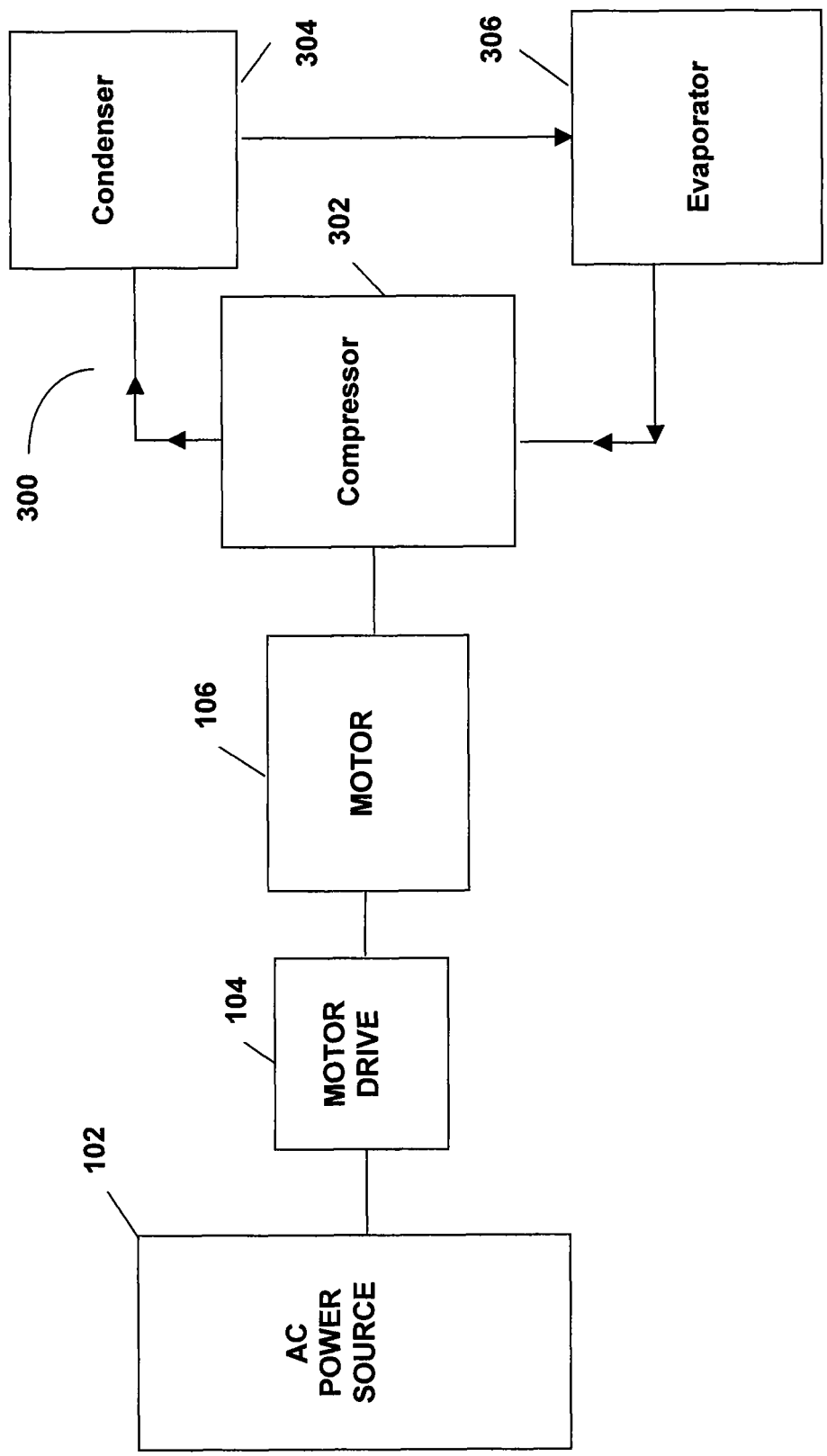
FIGS. 3A and 3B illustrate schematically a refrigeration system that can be used with the present invention.
Figure 3B:
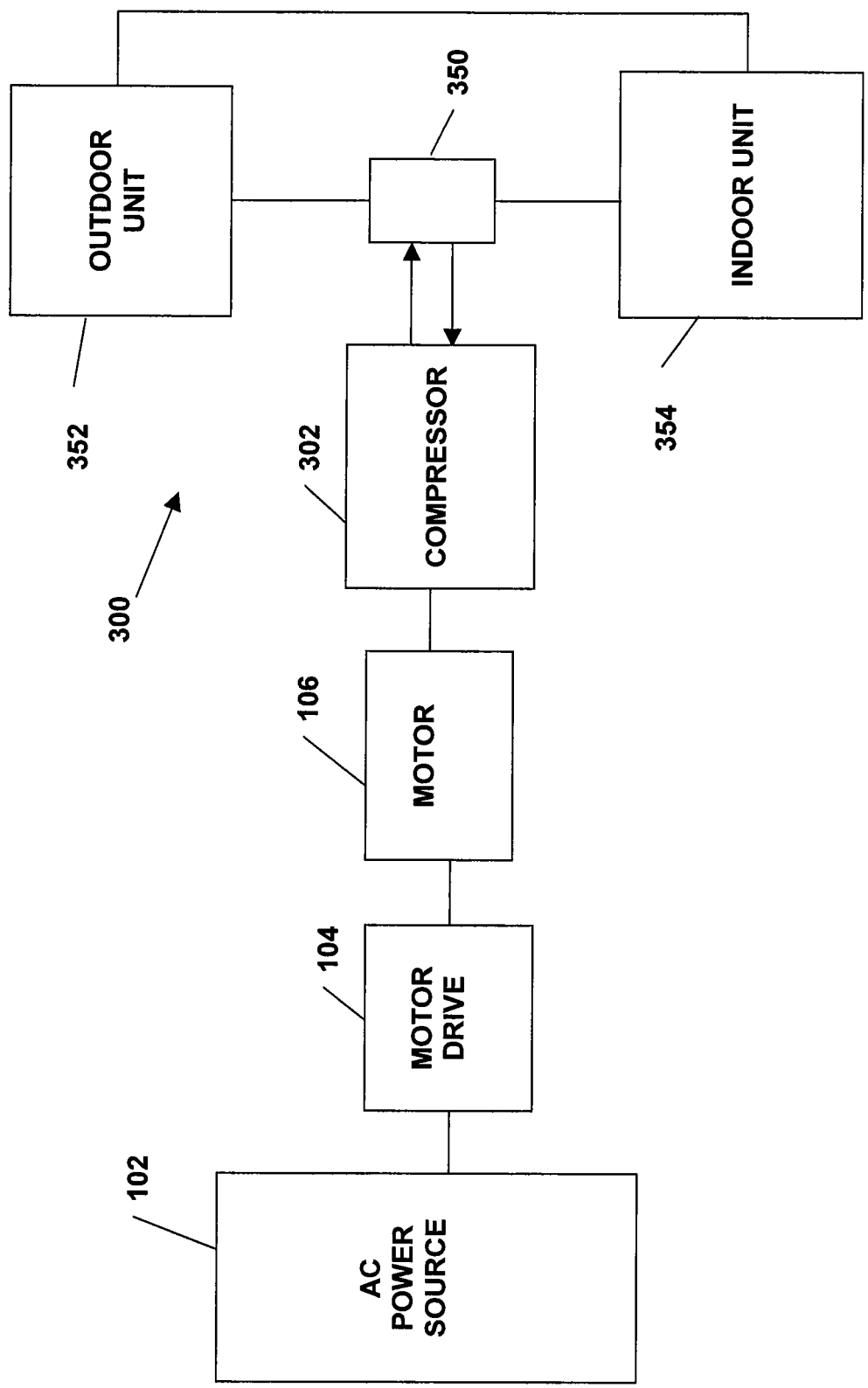

As shown in FIGS. 3A and 3B, the heating, ventilation, air conditioning and refrigeration (HVAC&R) system 300 includes a compressor 302, a condenser arrangement 304, and an evaporator arrangement 306 or a compressor 302, a reversing valve arrangement 350, an indoor unit 354 and an outdoor unit 352. The system 300 can be operated as an air conditioning only system, where the evaporator arrangement 306 is preferably located indoors, i.e., as indoor unit 354, to provide cooling to the indoor air and the condenser arrangement 304 is preferably located outdoors, i.e., as outdoor unit 352, to discharge heat to the outdoor air. The system can also be operated as a heat pump system with the inclusion of the reversing valve arrangement 350 to control and direct the flow of refrigerant from the compressor 302. When the heat pump is operated in an air conditioning mode, the reversing valve arrangement 350 is controlled for refrigerant flow as described above for an air conditioning system. However, when the heat pump is operated in a heating mode, the flow of the refrigerant is in the opposite direction from the air conditioning mode and the condenser arrangement 304 is preferably located indoors, i.e., as indoor unit 354, to provide heating of the indoor air and the evaporator arrangement 306, i.e., as outdoor unit 352, is preferably located outdoors to absorb heat from the outdoor air.

Referring back to the operation of the system 300, whether operated as a heat pump or as an air conditioner, the compressor 302 is driven by the motor 106 that is powered by VSD 104. The VSD 104 receives AC power having a particular fixed line voltage and fixed line frequency from AC power source 102 and provides power to the motor 106. The motor 106 used in the system 300 can be any suitable type of motor that can be powered by a VSD 104. The motor 106 is preferably a switched reluctance (SR) motor, but can also be an induction motor, electronically commutated permanent magnet motor (ECM) or any other suitable motor type. In addition, the preferred SR motor should have a relatively flat efficiency vs. load curve. The relatively flat efficiency vs. load curve indicates that the efficiency of the SR motor does not change significantly with changes in the load. Furthermore, each stator phase in the SR motor is independent of the other stator phases in the SR motor. The independent stator phases enable the SR motor to continue to operate at a reduced power if one of the stator phases should fail.

Referring back to FIGS. 3A and 3B, the compressor 302 compresses a refrigerant vapor and delivers the vapor to the condenser 304 through a discharge line (and the reversing valve arrangement 350 if operated as a heat pump). The compressor 302 is preferably a reciprocating compressor. However, it is to be understood that the compressor 302 can be any suitable type of compressor, e.g., rotary compressor, screw compressor, swag link compressor, scroll compressor, turbine compressor, or any other suitable compressor. The refrigerant vapor delivered by the compressor 302 to the condenser 304 enters into a heat exchange relationship with a fluid, e.g., air or water, but preferably air, and undergoes a phase change to a refrigerant liquid as a result of the heat exchange relationship with the fluid. The condensed liquid refrigerant from the condenser 304 flows through an expansion device (not shown) to the evaporator 306.

The condensed liquid refrigerant delivered to the evaporator 306 enters into a heat exchange relationship with a fluid, e.g., air or water, but preferably air, and undergoes a phase change to a refrigerant vapor as a result of the heat exchange relationship with the fluid. The vapor refrigerant in the evaporator 306 exits the evaporator 306 and returns to the compressor 302 by a suction line to complete the cycle (and the reversing valve arrangement 350 if operated as a heat pump). It is to be understood that any suitable configuration of the condenser 304 and the evaporator 306 can be used in the system 300, provided that the appropriate phase change of the refrigerant in the condenser 304 and evaporator 306 is obtained. The HVAC or refrigeration system 300 can include many other features that are not shown in FIGS. 3A and 3B. These features have been purposely omitted to simplify the drawing for ease of illustration.

Figure 4:
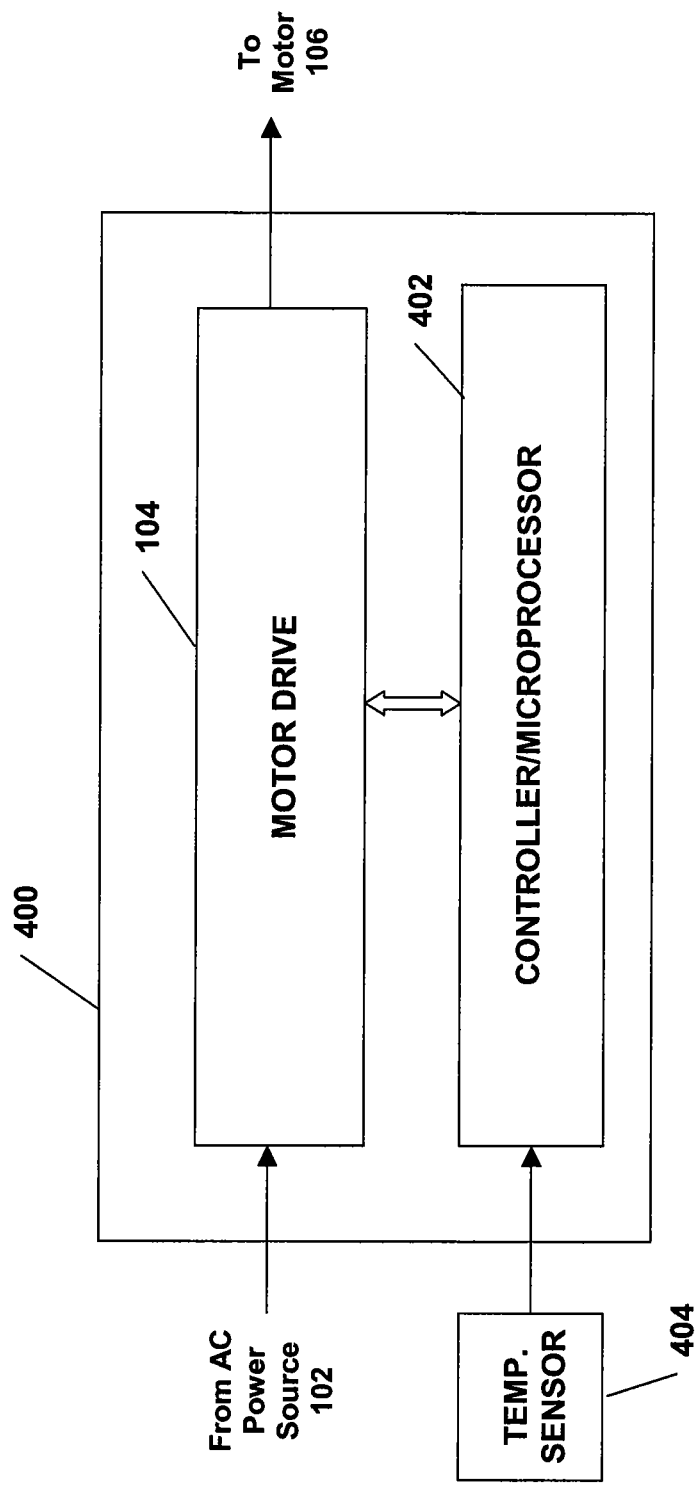
FIG. 4 illustrates schematically an embodiment of a control drive of the present invention.

FIG. 4 illustrates an embodiment of a capacity control system 400 used to provide capacity modulation in the compressor 304. The capacity control system 400 includes the motor/VSD drive 104, as discussed above, to power the motor 106 of the compressor 302. In addition, the capacity control system 400 also includes a controller or a microprocessor 402 used to control the operation of the motor drive 104. In a preferred embodiment of the present invention, the controller or microprocessor 402 and the motor drive 104 are integrated on a single circuit board. However, it is to be understood that the controller or microprocessor 402 and the motor drive 104 can be separate from each other.

In addition, a temperature sensor 404 is used to provide a measurement of the outdoor ambient temperature to the controller or microprocessor 402. The temperature sensor 404 can be any suitable device for measuring or deriving temperature and can be located in any suitable location that can provide an accurate determination of the outdoor ambient temperature. Preferably, the controller 402 can be configured to control the output of the motor drive 104 in response to a temperature measurement from the temperature sensor 404 after receiving a mode of operation signal, e.g., a heating mode signal or cooling mode signal, from a thermostat control or other similar device.

In another embodiment of the present invention, the controller 402 can control the output of the motor drive 104 in response to other system parameters. For example, the controller 402 can control the motor drive 104 in response to measurements of condenser refrigerant pressure, evaporator refrigerant pressure, liquid line temperature, evaporator refrigerant temperature, condenser refrigerant temperature, suction pressure or temperature, motor current and/or condenser air temperature. It is to be understood that the appropriate sensor is used to measure the desired system parameter. Furthermore, the specific operation of the controller 402 may require modifications to accommodate a particular system parameter in order to provide the appropriate output capacity from the compressor. In still another embodiment of the present invention, the controller 402 can control the output of the motor drive 104 in response to the temperature in the conditioned/enclosed space.

The controller or microprocessor 402 can provide the appropriate control signals to the motor drive 104 to control the output of the motor drive 104, i.e., output voltage and output frequency from the motor drive 104. By controlling the output of the motor drive 104, the controller 402 is able to control the output speed of the motor 106 and in turn, the output capacity of the compressor 302. Preferably, the controller 402 provides control signals to the motor drive 104 that result in one of several discrete output frequencies (and corresponding voltages) being provided to the motor 106 by the motor drive 104. The corresponding voltage to be provided to the motor 106 by the motor drive 104 for a particular output frequency can be either a preset voltage that is selected to provide optimal performance or an adjustable voltage that can be determined by the controller 402 in response to system conditions. The discrete output frequencies and corresponding voltages provided to the motor 106 result in discrete operating speeds for the motor 106 and discrete output capacities for the compressor 302.

In a preferred embodiment of the present invention, the compressor 302 can be controlled and operated to have two or more discrete output capacities in response to an outdoor temperature measurement. During operation of the system 300 in an air conditioning or cooling mode, the compressor 302 has a first output capacity in response to the outdoor temperature being greater than a first temperature setpoint and the compressor 302 has a second output capacity in response to the outdoor temperature being less than a second temperature setpoint. During operation of the system 300 in a heating mode, the compressor 302 can be operated at a plurality of different output capacities in response to the outdoor temperature and, optionally, a particular stage of heating required by the thermostat for the enclosed space being heated.

In one embodiment of the present invention, the system 300 is operated in an air conditioning or cooling mode (based on a thermostat control signal) and the controller 402 controls the motor drive 104 to provide two discrete output frequencies to the motor 106 depending on the outdoor ambient temperature. In addition, the motor drive 104 can provide the appropriate output voltage for the discrete output frequencies to maintain optimal motor performance. The first output frequency produced by the motor drive 104 is between about 35 Hz and about 55 Hz and is initiated in response to the outdoor ambient temperature being greater than a first temperature setpoint. However, in another embodiment, the first output frequency produced by the motor drive 104 can be between about 70 Hz and about 120 Hz. Operating the motor 106 at the first output frequency results in the compressor 302 providing a first output capacity. The first temperature setpoint can be between about 88° F. and about 95° F. and is preferably about 92° F.

The second output frequency produced by the motor drive 104 is between about 28 Hz and about 45 Hz and is initiated in response to the outdoor ambient temperature being less than a second temperature setpoint. However, in another embodiment, the second output frequency produced by the motor drive 104 can be between about 50 Hz and about 100 Hz. Operating the motor 106 at the second output frequency results in the compressor 302 providing a second output capacity that is lower than the first output capacity. The second temperature setpoint can be between about 82° F. and about 88° F. and is preferably about 85° F. In addition, the first temperature setpoint and the second temperature setpoint are selected to provide a deadband region between the two temperature setpoints. This deadband region is used to avoid frequent changing of the output frequency of the motor drive 104 between the first output frequency and the second output frequency. The deadband region is preferably between about 2° F. and about 10° F.

The second output frequency is selected to provide a reduction in compressor output capacity, or compressor displacement, of about 15% to about 20%, and preferably about 18%, from the first output capacity of the compressor 302. This reduction in capacity from operation of the motor 106 at the second output frequency occurs automatically and does not require any adjustment of the indoor air flow or fan speed in order to maintain the proper amount of humidity control for the interior space.

The reduction in compressor capacity can increase the efficiency of the system 300 by providing effectively larger heat transfer surfaces (for the corresponding refrigerant flow) in the condenser arrangement 304 and the evaporator arrangement 306. The reduction in compressor capacity can also provide some noise reduction for the compressor 302 because the compressor 302 has a reduced sound signature at the lower operating frequencies and speed.

Figure 5:
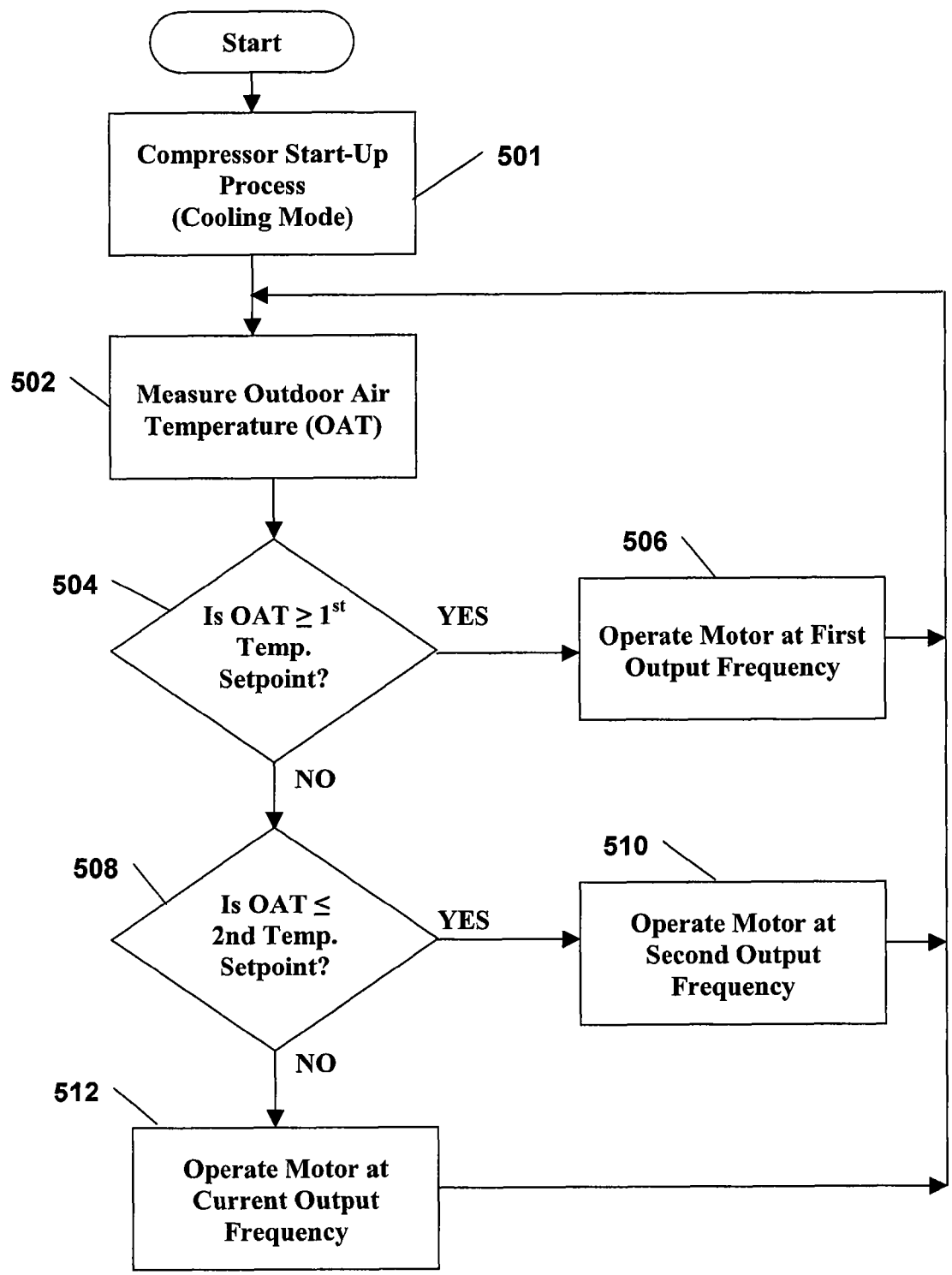
FIG. 5 illustrates a flow chart of one embodiment of the capacity control process of the present invention for cooling mode operation.

FIG. 5 illustrates a process for capacity modulation of the compressor 302 during operation in an air conditioning mode. The process begins at step 501 where a start-up process for the compressor is executed. The start-up process measures the outdoor ambient temperature with the temperature sensor 404 and then proceeds to start-up the compressor 302 to operate at the second output capacity unless the measured outdoor ambient temperature is greater than or equal to the first temperature setpoint, then the start-up process proceeds to start-up the compressor 302 to operate at the first output capacity. Next, in step 502 the outdoor ambient temperature is measured using the temperature sensor 404. In step 504, the measured outdoor ambient temperature is compared to the first temperature setpoint to determine if the measured outdoor ambient temperature is greater than or equal to the first temperature setpoint. If the measured outdoor ambient temperature is greater than or equal to the first temperature setpoint in step 504, then the process proceeds to step 506 where the motor 106 is operated at the first output frequency. The process returns to step 502 to measure the outdoor ambient temperature and repeat the process. If the measured outdoor ambient temperature is not greater than or equal to, i.e., it is less than, the first temperature setpoint in step 504, then the process proceeds to step 508. In step 508, the measured outdoor ambient temperature is compared to the second temperature setpoint to determine if the measured outdoor ambient temperature is less than or equal to the second temperature setpoint. If the measured outdoor ambient temperature is less than or equal to the second temperature setpoint in step 508, the process then proceeds to step 510 where the motor 106 is operated at the second output frequency. The process returns to step 502 to measure the outdoor ambient temperature and repeat the process. If the measured outdoor ambient temperature is not less than or equal to, i.e., it is greater than, the second temperature setpoint in step 508, then the process proceeds to step 512 where the motor 106 is continued to be operated at the current output frequency, either the first output frequency or the second output frequency. The process returns to step 502 to measure the outdoor ambient temperature and repeat the process.

In another embodiment of the present invention, the controller 402 can also control the motor drive 104 to provide a plurality of discrete output frequencies to the motor 106 during operation of the system 300 in a cooling mode. The first output frequency produced by the motor drive 104 is between about 48 Hz and about 55 Hz and is initiated in response to the outdoor ambient temperature being less than an initial temperature setpoint. The initial temperature setpoint can be between about 88° F. and about 95° F. and is preferably about 92° F. Operating the motor 106 at the first output frequency results in the compressor 302 providing a first output capacity. The motor drive 104 can also produce a second output frequency of between about 55 Hz and about 60 Hz and in response to the outdoor ambient temperature being greater than the initial temperature setpoint. Operating the motor 106 at the second output frequency results in the compressor 302 providing a second output capacity that is greater than the first output capacity.

Additional cooling mode output frequencies produced by the motor drive 104 are between about 20 Hz and about 45 Hz and are initiated in response to the outdoor ambient temperature being progressively lower than the initial temperature setpoint. Operating the motor 106 at the additional output frequencies results in the compressor 302 providing progressively lower output capacities that are less than the first output capacity. In other words, when the system 300 is operating in a cooling mode, the output frequency produced by the motor drive 104 and the corresponding output capacity of the compressor 302 are progressively decreased as the outdoor ambient temperature progressively decreases below the initial temperature setpoint. In addition, the controller 402 (or another controller) can adjust the indoor air flow or fan speed control to accommodate changes in the output capacity of the compressor 302. Preferably, there are one or more additional "cooling" temperature setpoints at temperatures lower than the initial temperature setpoint discussed above. When the outdoor ambient temperature drops below these additional "cooling" temperature setpoints, the output frequency of the motor drive 104 is correspondingly decreased. For example, additional "cooling" temperature setpoints can be set at about 70° F., about 75° F., about 80° F. and about 85° F. and can result in the motor drive producing corresponding output frequencies of about 30 Hz, about 35 Hz, about 40 Hz and about 45 Hz. In addition, a deadband region(s) can be provided between the "cooling" temperature setpoints for the cooling mode operation to prevent frequent changing of the output frequency of the motor drive 104. It is to be understood that the above temperature setpoints and corresponding frequencies are only examples and any desired or suitable temperature setpoint(s) and corresponding frequencies can be selected and used.

During operation of the system 300 in a heating mode (based on a thermostat control signal), the controller 402 can also control the motor drive 104 to provide a plurality of discrete output frequencies to the motor 106. The plurality of discrete output frequencies provided to the motor 106 by the controller 402 in the heating mode can be related to the output frequencies provided to the motor 106 by the controller 402 in the cooling mode. The controller 402 can use some, all, or none of the output frequencies from cooling mode operation during heating mode operation. In addition, auxiliary heating capacity, e.g., resistance heating, can be engaged by the controller 402 under appropriate circumstances.

In heating mode, the controller 402 can control the motor drive 104 to provide a plurality of discrete output frequencies to the motor 106 based on the outdoor ambient temperature during operation of the system 300. Each discrete output frequency of the plurality of discrete output frequencies is associated with an outdoor ambient temperature and is inversely related to the outdoor ambient temperature. Specifically, the higher the outdoor ambient temperature, the lower the discrete output frequency that is supplied by the motor drive 104. The plurality of discrete outdoor frequencies can be separated by amounts ranging from about 5 Hz to about 20 Hz.

In another embodiment, the selection of the discrete output frequency by the controller 402 can be based on both the outdoor ambient temperature and a demand for heating received by the controller 402, e.g., demand for first stage heating, demand for second stage heating, etc. For example, a demand for a particular stage of heating may result in an increase (or decrease) of the discrete output frequency that is different from the output frequency that would be based on outdoor ambient temperature alone. In another example, particular output frequencies based on corresponding outdoor ambient temperatures) may only be available when particular demands for heating are present. In this example, operation at higher output frequencies may only be available when a demand for second stage (higher output) heating is present.

In one embodiment of heating mode operation, the first output frequency produced by the motor drive 104 is about 30 Hz and is initiated in response to the outdoor ambient temperature being greater than an initial temperature setpoint. The initial temperature setpoint can be about 60° F. Additional heating mode output frequencies produced by the motor drive 104 are initiated in response to the outdoor ambient temperature being progressively lower than the initial temperature setpoint. Operating the motor 106 at the additional output frequencies results in the compressor 302 providing progressively greater output capacities that are greater than the first output capacity. It is to be understood that the increase in output capacity occurs until a predetermined outdoor ambient temperature is reached. After reaching the predetermined outdoor ambient temperature, the capacity of the compressor begins to decrease again (assuming limitations on increasing the drive frequency above a certain level). In other words, when the system 300 is operating in a heating mode, the output frequency produced by the motor drive 104 and the corresponding output capacity of the compressor 302 is progressively increased (to a point) as the outdoor ambient temperature progressively decreases below the initial temperature setpoint.

There can be one or more additional "heating" temperature setpoints at temperatures lower than the initial temperature setpoint discussed above. When the outdoor ambient temperature drops below these additional "heating" temperature setpoints, the output frequency of the motor drive 104 is correspondingly increased. For example, additional "heating" temperature setpoints can be set at about 50° F., about 40° F., about 30° F., about 20° F., about 10° F., about 0° F. and about −10° F. and can result in the motor drive producing corresponding output frequencies of about 35 Hz, about 45 Hz, about 60 Hz, about 80 Hz, about 100 Hz and about 120 Hz (for temperatures of about 0° F. and below). It is to be understood that the above temperature setpoints and corresponding frequencies are only examples and any desired or suitable temperature setpoint(s) and corresponding frequencies can be selected and used.

Figure 7:
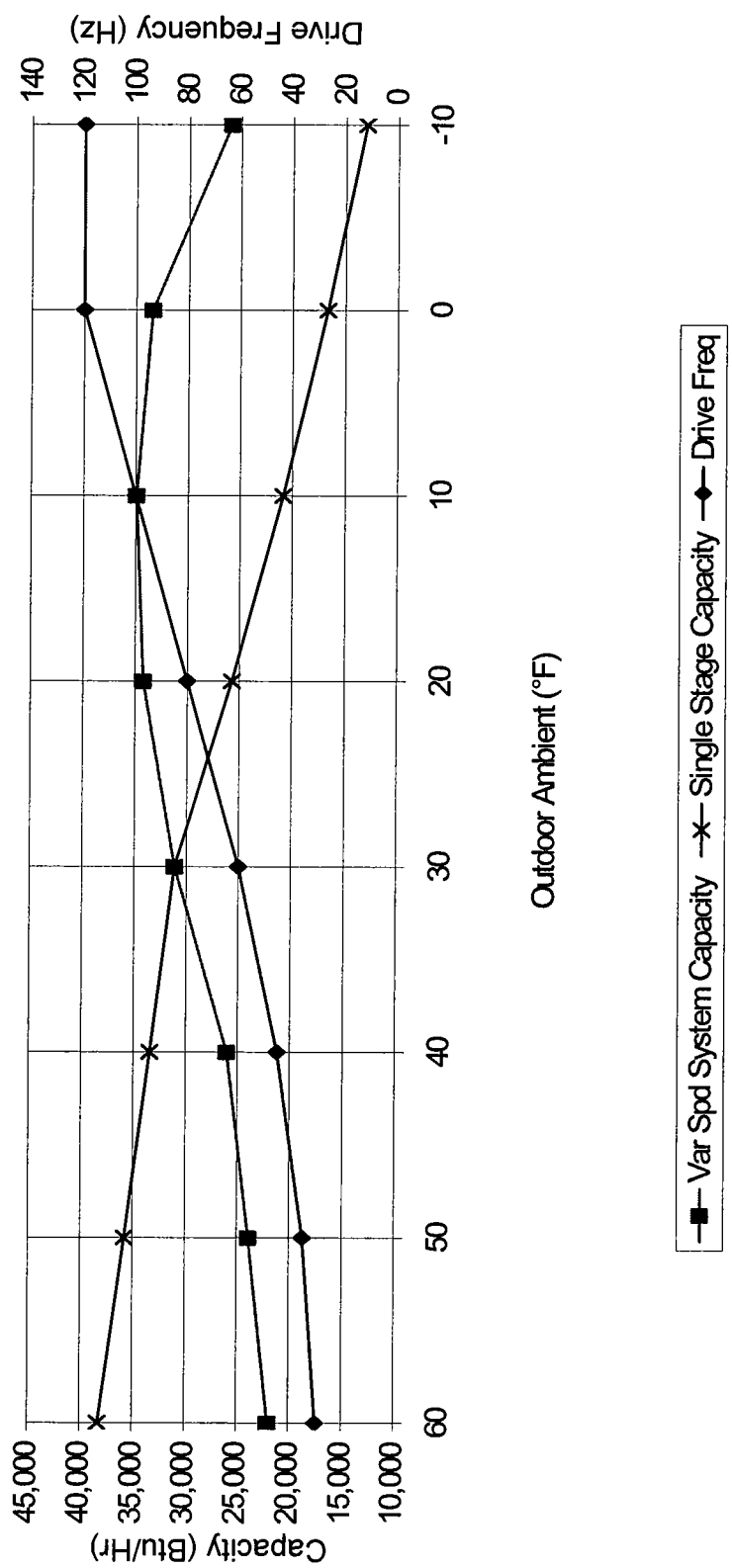
FIG. 7 illustrates system output capacities during heating mode operation.

FIG. 7 illustrates the difference in compressor capacity in the heating mode when operating the compressor at a single stage capacity, i.e., using a fixed frequency, versus operating the compressor at variable capacities, i.e., using variable frequencies as discussed above. In addition, a deadband region(s) can be provided between the "heating" temperature setpoints for the heating mode operation to prevent frequent changing of the output frequency of the motor drive 104. For example, once a discrete output frequency has been selected by the controller 402, it is not changed until another outdoor ambient temperature setpoint has been passed.

Figure 6:
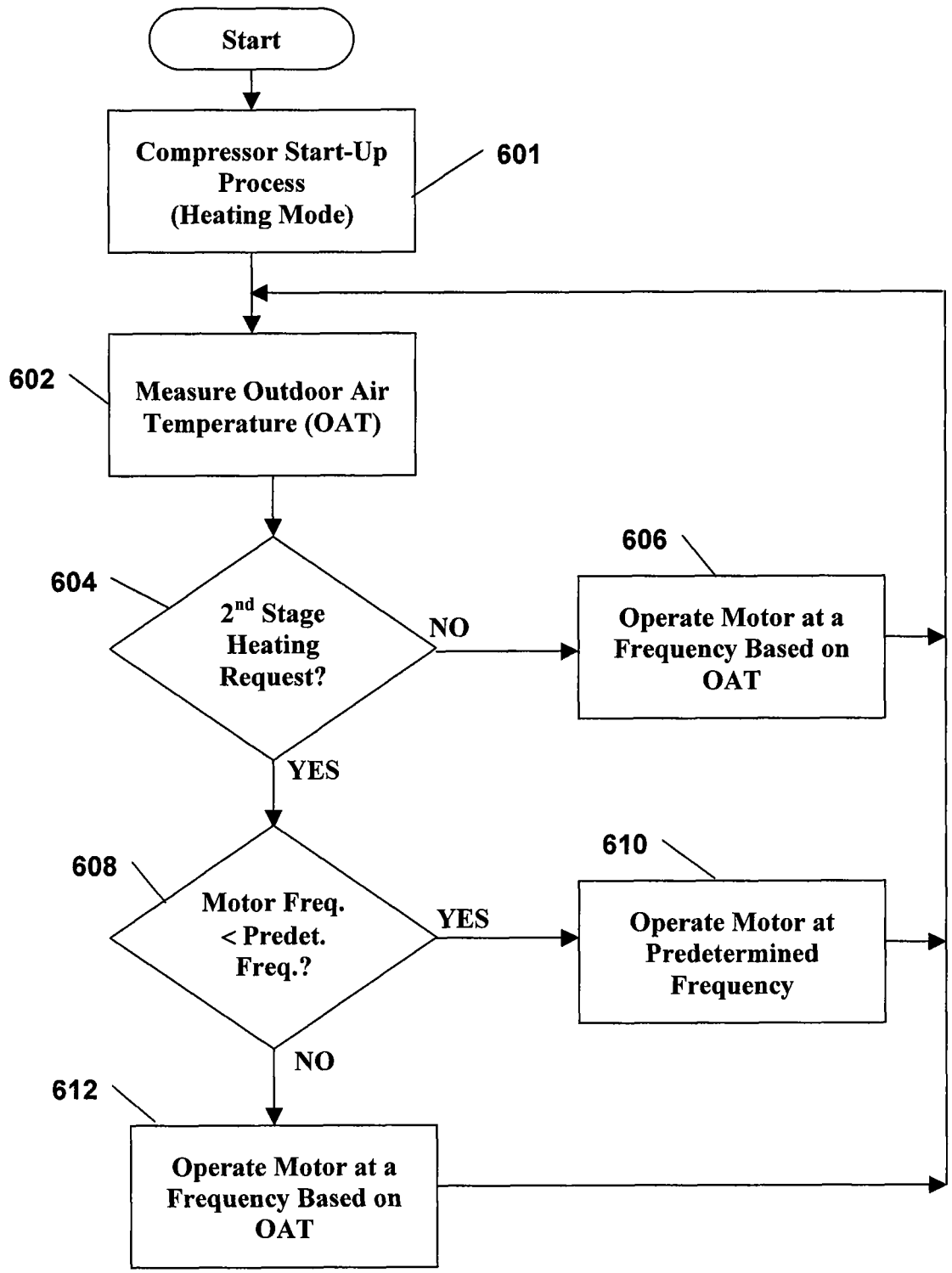
FIG. 6 illustrates a flow chart of another embodiment of the capacity control process of the present invention for heating mode operation.

FIG. 6 illustrates a process for capacity modulation of the compressor 302 during operation in a heating mode. The process begins at step 601 where a start-up process for the compressor is executed. The start-up process receives a first stage heating signal and then proceeds to start-up the compressor 302 to operate at a predetermined start-up frequency and corresponding output capacity. Next, in step 602 the outdoor ambient temperature is measured using the temperature sensor 404. In step 604, the controller 402 determines if an optional second stage heating demand has been made. If a second stage heating demand has been received in step 604, then the process proceeds to step 608. If a second stage heating demand has not been received in step 604, then the process proceeds to step 606 where the motor 106 is operated at a predetermined output frequency based on the measured outdoor ambient temperature. The process returns to step 602 to measure the outdoor ambient temperature and repeat the process.

In step 608, the operating frequency of the motor 106 is compared to a predetermined operating frequency to determine if the operating frequency of the motor is less than the predetermined operating frequency. If the operating frequency of the motor is less than the predetermined operating frequency in step 608, the process then proceeds to step 610 where the motor 106 is operated at the predetermined operating frequency. The process returns to step 602 to measure the outdoor ambient temperature and repeat the process. If the measured outdoor ambient temperature is not less than, i.e., it is greater than or equal to, the predetermined operating frequency in step 608, then the process proceeds to step 612 where the motor 106 is operated at a predetermined output frequency based on the measured outdoor ambient temperature. The process returns to step 602 to measure the outdoor ambient temperature and repeat the process.

In another embodiment of the present invention, step 608 can be replaced by a step that determines whether the controller has received the second stage heating demand for the first time. If the second stage heating demand has been received for the first time, step 610 is replaced by a step where the controller 402 can increase the frequency of the motor by a step or frequency increment, as discussed above, that can be supplied to the motor, e.g., from 45 Hz to 50 Hz. The process then returns to measure the outdoor ambient temperature. If it is not the first time the second stage heating demand has been received, the process would proceed to step 612 as described above with respect to FIG. 6.

In a preferred embodiment of the present invention, the controller 402 is programmable by a user. A user either at the factory (before installation) or in the field (during or after installation) can program the controller 402 to set the desired operating frequencies, e.g., first, second, etc., in both the heating mode and the air conditioning or cooling mode. In addition, a user can configure the controller to set desired temperature setpoints and deadband regions for both the heating mode and the air conditioning mode. By being programmable, the controller 402 is able to be adjusted to operate the compressor 302 in accordance with particular system configurations and conditions (e.g., condenser and/or evaporator coil size or surface area, amount and type of refrigerant charge, and condenser and/or evaporator airflow) to provide a desired system performance. The programmability of the controller 402 (and compressor 302) may remove the need to change or alter other system components to obtain a desired system performance such that the desired system performance can be obtained by adjusting only the controller 402.

The controller 402 can be programmed only one time or can be programmed and erased multiple times. The programmability of the controller 402 enables a single controller/compressor combination to be used with a variety of different types of refrigeration system configurations and still provide a desired system performance for each of the systems.

For example, the controller 402 can provide initial output frequencies and initial output voltages. The initial output frequencies are preferably set to initial predetermined frequencies and the initial output voltages can either be set to an initial predetermined voltages or can be determined and set by the controller 402 as discussed above. Next, the particular system configurations and conditions for the HVAC&R system into which the controller 402 and compressor 302 are going to be installed are determined. The initial predetermined frequency values for one or more of the initial output frequencies and possibly one or more of the initial output voltages can be adjusted in response to the determined system configurations and conditions. The HVAC&R system is then tested with the output frequencies and the output voltages, as adjusted, to determine the performance of the HVAC&R system. One or more of the output frequencies can be further adjusted and possibly one or more of the output voltages can be further adjusted in response to the determined system performance not being the desired system performance. Finally, the testing of the HVAC&R system and the adjusting of one or more of the output frequencies and possibly one or more of the output voltages can be repeated until the desired performance for the HVAC&R system is obtained.

In another embodiment of the present invention, the controller 402 can be used to provide overload and underload protection to the motor 106. The controller 402 can measure the current being provided to the motor 106 by the motor drive 104 with respect to the outdoor ambient temperature measured by the temperature sensor 404 and can take corrective action if an overload or underload condition is present in the motor 106 or motor drive 104. Specifically, there will be a direct relationship between the measured motor current and the outdoor ambient temperature that determines if an overload or underload condition is present. For example, an overload condition can be determined to be present by exceeding a predetermined outdoor temperature for a specific motor current value.

In still another embodiment of the present invention, an override signal can be provided to override the capacity modulation process set forth above. The override signal can be used to force the operation of the motor 106 at a particular output frequency instead of operating the motor 106 at the selected output frequency in accordance with signals from the capacity modulation process. The override signal can be generated by a thermostat or other control device or can be provided as a direct or manual input by a user of the system 300. For example, the override signal can be used to provide additional or boosted cooling capacity from the compressor 302 during cooling mode operation, i.e., the compressor 302 can be operated at the first output capacity instead of the second output capacity, when other conditions and factors take precedence over the lower outdoor ambient temperature control of the capacity modulation process set forth above.

If the temperature in an enclosed space to be cooled is greater than the temperature setpoint for the enclosed space by a predetermined amount and the capacity modulation process is operating the compressor 302 at the second output capacity, the capacity modulation process is overridden and the compressor 302 is operated at the first output capacity. The override control provided by the override signal can be for a predetermined override time period, e.g., 1 hour, or the override control can continue until the condition that triggered the override signal is satisfied, e.g., satisfaction of a temperature setpoint for an enclosed space. Once the override control has ended, the capacity modulation process resumes control of the operation of the compressor 302. In another embodiment, the controller 402 can initiate the override control in response to system conditions, e.g., extended operation at the lower output capacity in either heating or cooling mode of operation. The override control in this embodiment can be terminated as discussed above, i.e., satisfaction of a predetermined time period or of the temperature setpoint for the enclosed space.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for modulating capacity in a compressor for a heat pump operating in a heating mode, the method comprising:
    providing a controller operable to provide control signals to generate a plurality of preselected output frequencies for a motor of a compressor;
    measuring an outdoor ambient temperature;
    comparing the measured outdoor ambient temperature to a plurality of temperature setpoints, each temperature setpoint of the plurality of temperature setpoints being associated with a preselected output frequency of the plurality of preselected output frequencies, each preselected output frequency of the plurality of preselected output frequencies progressively increases in value as each associated temperature setpoint of the plurality of temperature setpoints progressively decreases in value;
    selecting a preselected output frequency of the plurality of preselected output frequencies based on the measured outdoor ambient temperature being less than a temperature setpoint of the plurality of temperature setpoints, the selected preselected output frequency being associated with a minimum temperature setpoint of the temperature setpoints greater than the measured outdoor ambient temperature;
    operating the motor at the selected preselected output frequency and a corresponding voltage to produce a corresponding output capacity for the compressor.

2. The method of claim 1 further comprising repeating the steps of measuring an outdoor ambient temperature, comparing the measured outdoor ambient temperature, selecting a preselected output frequency, and operating the motor at the selected preselected output frequency until a demand for heating is satisfied.

3. The method of claim 1 further comprising the step of executing a start-up process for the compressor, the step of executing a start-up process for the compressor includes:
    receiving a first stage heating signal indicating a demand for heating; and
    operating the motor at a predetermined startup frequency and a corresponding voltage to produce a corresponding output capacity for the compressor.

4. The method of claim 1 further comprising:
determining whether a demand for additional heating is present; and
executing the steps of selecting a preselected output frequency and operating the motor at the selected preselected output frequency in response to no demand for additional heating being present.

5. The method of claim 4 further comprising the step of:
determining whether an operating frequency for the motor is less than a predetermined frequency in response to a demand for additional heating being present;
executing the steps of selecting a preselected output frequency and operating the motor at the selected preselected output frequency in response to the operating frequency for the motor being greater than the predetermined frequency; and
operating the motor at the predetermined frequency in response to the operating frequency for the motor being less than a predetermined frequency.

6. The method of claim 4 further comprising the step of:
determining whether the demand for additional heating has been present more than one time in response to a demand for additional heating being present;
executing the steps of selecting a preselected output frequency and operating the motor at the selected preselected output frequency in response to the demand for additional heating being present more than one time; and
selecting a preselected output frequency of the plurality of preselected output frequencies greater than an operating frequency of the motor in response to the demand for additional heating being present one time.

7. The method of claim 6 wherein the step of selecting a preselected output frequency of the plurality of preselected output frequencies greater than an operating frequency of the motor includes selecting a next greater preselected output frequency of the plurality of preselected output frequencies.

8. The method of claim 1 further comprising programming by a user, at least one temperature setpoint of the plurality of temperature setpoints.

9. The method of claim 1 further comprising programming, by a user, at least one preselected output frequency of the plurality of preselected output frequencies.

10. The method of claim 1 wherein:
the plurality of preselected output frequencies includes at least two preselected output frequencies selected from the group consisting of about 35 Hz, about 45 Hz, about 60 Hz, about 80 Hz, about 100 Hz and about 120 Hz; and
the plurality of temperature setpoints includes at least two temperature setpoints selected from the group consisting of about 50° F., about 40° F., about 30° F., about 20° F., about 10° F. and about 0° F.

11. The method of claim 1 wherein a preselected output frequency of 35 Hz has an associated temperature setpoint of 50° F., a preselected output frequency of 45 Hz has an associated temperature setpoint of 40° F., a preselected output frequency of 60 Hz has an associated temperature setpoint of 30° F., a preselected output frequency of 80 Hz has an associated temperature setpoint of 20° F., a preselected output frequency of 100 Hz has an associated temperature setpoint of 10° F., a preselected output frequency of 120 Hz has an associated temperature setpoint of 0° F.

12. The method of claim 1 wherein the plurality of preselected output frequencies are separated by at least 5 Hz.

13. An HVAC&R system comprising:
a compressor, a condenser and an evaporator connected in a closed refrigerant loop;
a motor connected to the compressor to power the compressor, the motor being configured to operate at a plurality of output speeds to generate a plurality of output capacities from the compressor;
a control system, the control system being configured to provide the motor with a plurality of preselected output frequencies to generate the plurality of output speeds in the motor;
a sensor to measure an outdoor ambient temperature and to provide a signal to the control system with the measured outdoor ambient temperature; and
wherein, in response to the HVAC&R system operating in a heating mode, the control system being configured to provide a preselected output frequency of the plurality of preselected output frequencies to the motor based on the measured outdoor ambient temperature being less than a temperature setpoint of a plurality of temperature setpoints, each temperature setpoint of the plurality of temperature setpoints being associated with a preselected output frequency of the plurality of preselected output frequencies, each preselected output frequency of the plurality of preselected output frequencies progressively increases in value as each associated temperature setpoint of the plurality of temperature setpoints progressively decreases in value, the provided preselected output frequency being associated with a minimum temperature setpoint of the temperature setpoints greater than the measured outdoor ambient temperature.

14. The HVAC&R system of claim 13 wherein the sensor is a temperature sensor.

15. The HVAC&R system of claim 13 further comprising a thermostat, the thermostat being configured to provide one of a first stage heating signal or a second stage heating signal to the control system, and wherein a second stage heating signal indicates a greater demand for heating than a first stage heating signal.

16. The HVAC&R system of claim 15 wherein the control system is configured to provide a preselected output frequency of the plurality of preselected output frequencies to the motor greater than an operating frequency of the motor to generate an increase in the output capacity of the compressor in response to receiving a second stage heating signal for a first time.

17. The HVAC&R system of claim 13 wherein the plurality of temperature setpoints are programmable by a user.

18. The HVAC&R system of claim 13 wherein the plurality of preselected output frequencies are programmable by a user.

19. The HVAC&R system of claim 13 wherein:
the plurality of preselected output frequencies includes at least two preselected output frequencies selected from the group consisting of about 35 Hz, about 45 Hz, about 60 Hz, about 80 Hz, about 100 Hz and about 120 Hz; and
the plurality of temperature setpoints includes at least two temperature setpoints selected from the group consisting of about 50° F., about 40° F., about 30° F., about 20° F., about 10° F. and about 0° F.

20. The HVAC&R system of claim 13 wherein the plurality of preselected output frequencies are separated by at least 5 Hz.

21. The HVAC&R system of claim 13 wherein the control system comprises:
a motor drive connected to the motor; and
a controller, the controller being configured to receive the signal with the measured outdoor ambient temperature, determine the provided preselected output frequency and provide control signals to the motor drive to operate the motor at the provided preselected output frequency.

22. The HVAC&R system of claim 13 wherein the compressor is a reciprocating compressor and the motor is a switched reluctance motor.

23. A method for controlling capacity in a compressor of an HVAC&R system, the method comprising:
provide a controller operable to provide control signals to generate a plurality of preselected output frequencies for a motor of the compressor;
measuring an outdoor ambient temperature;
determining whether the HVAC&R system is operating in a heating mode or a cooling mode;
in response to the HVAC&R system operating in a heating mode, executing a heating mode operation process comprising:
comparing the measured outdoor ambient temperature to a plurality of heating mode temperature setpoints, each heating mode temperature setpoint of the plurality of heating mode temperature setpoints being associated with a preselected heating mode output frequency of a plurality of preselected heating mode output frequencies, each preselected heating mode output frequency of the plurality of preselected heating mode output frequencies progressively increases in value as each associated heating mode temperature setpoint of the plurality of heating mode temperature setpoints progressively decreases in value;
selecting a preselected heating mode output frequency of a the plurality of preselected heating mode output frequencies based on the measured outdoor ambient temperature being less than a heating mode temperature setpoint of the plurality of heating mode temperature setpoints, the selected preselected heating mode output frequency being associated with a minimum heating mode temperature setpoint of the heating mode temperature setpoints greater than the measured outdoor ambient temperature; and
operating the motor at the selected preselected heating mode output frequency and a corresponding voltage to produce a corresponding output capacity for the compressor; and
in response to the HVAC&R system operating in a cooling mode, executing a cooling mode operation process comprising:
comparing the measured outdoor ambient temperature to at least one predetermined temperature setpoint;
selecting a preselected cooling mode output frequency of a plurality of preselected cooling mode output frequencies based on the comparison of the measured outdoor ambient temperature and the at least one predetermined temperature setpoint;
operating the motor at the selected cooling mode preselected output frequency and a corresponding voltage to produce a corresponding output capacity for the compressor; and
wherein the selected preselected cooling mode output frequency of the plurality of preselected cooling mode output frequencies progressively increases in response to the measured outdoor ambient temperature increasing to provide an increase in the output capacity of the compressor.

24. The method of claim 23 wherein the plurality of preselected output frequencies includes the plurality of preselected heating mode output frequencies and the plurality of preselected cooling mode output frequencies.

25. The method of claim 24 wherein the plurality of preselected output frequencies are separated by at least 5 Hz.

26. The method of claim 24 wherein the plurality of preselected heating mode output frequencies are different from each preselected cooling mode output frequency of the plurality of preselected cooling mode output frequencies.

27. The method of claim 24 wherein the plurality of preselected heating mode output frequencies includes at least one preselected cooling mode output frequency of the plurality of preselected cooling mode output frequencies.

28. The method of claim 23 wherein:
the step of comparing the measured outdoor ambient temperature to at least one predetermined temperature setpoint includes:
comparing the measured outdoor ambient temperature to a first predetermined temperature setpoint; and
comparing the measured outdoor ambient temperature to a second predetermined temperature setpoint; and
the step of selecting a preselected cooling mode output frequency of the plurality of preselected cooling mode output frequencies includes:
selecting a first cooling mode output frequency and corresponding voltage in response to the measured outdoor ambient temperature being greater than the first predetermined temperature setpoint; and
selecting a second cooling mode output frequency and corresponding voltage in response to the measured outdoor ambient temperature being less than or equal to the second predetermined temperature setpoint.

* * * * *